(12) United States Patent
Seo et al.

(10) Patent No.: US 12,244,712 B2
(45) Date of Patent: Mar. 4, 2025

(54) ARTIFICIAL INTELLIGENCE PIPELINE NON-FUNGIBLE TOKEN AND EXECUTION METHOD THEREOF

(71) Applicant: COMMON COMPUTER INC., Seoul (KR)

(72) Inventors: Dong Il Seo, Seoul (KR); Min Hyun Kim, Seoul (KR); Seong Hwa Yun, Seoul (KR); Young Seo Yoo, Seoul (KR)

(73) Assignee: COMMON COMPUTER INC., Seoul (KR)

( * ) Notice: Subject to any disclaimer, the term of this patent is extended or adjusted under 35 U.S.C. 154(b) by 227 days.

(21) Appl. No.: 17/963,568

(22) Filed: Oct. 11, 2022

(65) Prior Publication Data
US 2023/0231713 A1    Jul. 20, 2023

Related U.S. Application Data

(63) Continuation of application No. PCT/KR2022/012325, filed on Aug. 18, 2022.

(30) Foreign Application Priority Data

Jan. 5, 2022    (KR) .......................... 10-2022-0001501

(51) Int. Cl.
*H04L 9/32* (2006.01)
*H04L 9/00* (2022.01)

(52) U.S. Cl.
CPC ................ *H04L 9/321* (2013.01); *H04L 9/50* (2022.05)

(58) Field of Classification Search
CPC . H04L 9/321; H04L 9/50; G06F 16/27; G06F 9/3867; G06F 9/466; G06F 16/1834; G06F 16/2246; G06F 16/235; G06F 21/44; G06N 3/045
See application file for complete search history.

(56) References Cited

U.S. PATENT DOCUMENTS

| | | | | |
|---|---|---|---|---|
| 11,244,032 B1* | 2/2022 | Nguyen | ................... | G06F 9/547 |
| 11,461,774 B1* | 10/2022 | Khan | ................... | H04L 9/3213 |
| 2019/0236598 A1* | 8/2019 | Padmanabhan | ...... | G06Q 20/389 |
| 2021/0327008 A1* | 10/2021 | Salah | ...................... | G06F 8/38 |
| 2021/0360083 A1* | 11/2021 | Duggal | ................... | H04L 67/34 |

OTHER PUBLICATIONS

Cai et al., "Analysis of Blockchain System With Token-Based Bookkeeping Method", Apr. 2019, IEEE Access, vol. 7, pp. 50823-50832 (Year: 2019).*

* cited by examiner

*Primary Examiner* — Kenneth W Chang
(74) *Attorney, Agent, or Firm* — Burris Law, PLLC (57) ABSTRACT

The present disclosure relates to a non-transitory storage medium for storing program code and a method of executing an artificial intelligence (AI) pipeline non-fungible token (NFT). The program code is executed by a hardware processor to mint a blockchain-based NFT including ownership information of the AI pipeline, request an execution of the program code performing a predetermined function in an event node executing the AI pipeline according to a request of execution of an NFT owner, connect to at least one worker node to execute a target AI pipeline of the NFT, receive an execution result value of the worker node to record a proof-of-work for the execution result value in the event node, and collect the execution result value of the worker node on which the proof-of-work is performed is performed to change a blockchain state.

10 Claims, 6 Drawing Sheets

```
{
  "data" : "https://github.com/kmh4500/AINFT-
engine/blob/main/data/ain_train.txt",
    "model" : {
       "name" : "gpt2-en-large",
       "epoch" : 5,
       "platform": "ainize.ai/teachable-nlp"
    },
    "service": {
       "api": "ainize.ai/kmh4500/AINFT-engine",
       "demo" : "miniverse.afan.ai/ain"
    },
    "state": "insight.ainetwork.ai/database/values/apps/chat/AIN"
}
```

FIG.6

ARTIFICIAL INTELLIGENCE PIPELINE NON-FUNGIBLE TOKEN AND EXECUTION METHOD THEREOF

CROSS-REFERENCE OF RELATED APPLICATIONS AND PRIORITY

The Present Application is a continuation of International Application No. PCT/KR2022/012325 filed Aug. 18, 2022, which claims priority to and benefit of Korean Patent Application No. 10-2022-0001501 filed Jan. 5, 2022, the disclosure of which are incorporated by reference as if they are fully set forth herein.

TECHNICAL FIELD

The present disclosure relates to an artificial intelligence pipeline non-fungible token (NFT) and an execution method thereof.

BACKGROUND

Jeremy Rifkin argued that the age of ownership was over and the age of access had arrived. In other words, the age is shifting from the age of directly owning and managing goods or capital to the age of access to request and use goods or capital whenever necessary.

Today, networks connected through the Internet occupy a large area. The ownership is changing to the concept of access rights. However, the concept of ownership does not disappear, but can be understood as a changed concept, such as being able to provide or receive ownership in a new form with the advent of a new age. In short, when a user needs a specific material or capital, the concept of ownership is newly understood as guaranteeing the user's access to the material or the capital.

However, the ownership of the material or the capital to which access rights need to be granted is generally managed by a single entity. Therefore, when an owner intends to divide the ownership of the material or capital to which access rights need to be granted, a method of writing and notarizing a registration or a contract for proof of ownership offline has been used. Recently, a non-fungible token (NFT) has been in the spotlight because the NFT may prove a transaction of ownership on the networks connected through the Internet.

However, the NFT is being used only at a technically low level in that the NFT is used for the purpose of proof of original ownership of digital content. Accordingly, development is required to utilize the NFT at a new level of technology, such as a metaverse rather than the purpose of simple transaction proof.

SUMMARY

The present disclosure is directed to providing an artificial intelligence pipeline non-fungible token (NFT) and an execution method thereof.

A non-transitory storage medium according to an embodiment of the present disclosure is a non-transitory storage medium for storing program code, in which the program code is executed by a hardware processor. The program code is executed to transact an artificial intelligence (AI) pipeline based on ownership information created based on a non-fungible token (NFT) in a distributed blockchain network. The distributed blockchain network stores and manages a database including a plurality of blockchain states that are updated according to one or more transactions related to a function received from a client. The program code is executed through the hardware processor to: i) mint a blockchain-based NFT including ownership information of the AI pipeline, which is a target for granting code reflecting the blockchain-based NFT, object information related to characteristics of the AI pipeline, and worker node address information executing the AI pipeline, ii) request an execution of the program code performing a predetermined function in an event node executing the AI pipeline according to a request of an NFT owner, iii) access at least one worker node to execute a target AI pipeline of the NFT, iv) receive an execution result value of the worker node to record a proof-of-work in the event node, and v) collect the execution result value of the worker node on which the proof-of-work is performed to propagate a value to the distributed blockchain network in order to change a blockchain state.

The distributed blockchain network may configure a plurality of blockchain states in a tree structure including a plurality of sub-trees.

When the program code is executed through the hardware processor to execute the target AI pipeline of the NFT, the program code may receive an execution value from a worker node corresponding to each layer of the node of the sub-tree and create the proof-of-work of the execution value with a node of an upper layer, and a node of a top layer may be executed to propagate the proof-of-work to the event node. The program code may access a plurality of worker nodes for an event node having a predetermined function to execute the target AI pipeline of the NFT and select results for a plurality of execution results to create a new AI pipeline NFT.

The AI pipeline NFT may include NFT metadata and an NFT smart contract.

The NFT metadata may include ownership information of the AI pipeline, object information related to characteristics of the AI pipeline, and worker node address information executing the AI pipeline.

NFT media data connected to the NFT metadata may be code data of the AI pipeline, preprocessed data for AI learning, or the like, and may be data stored in an external storage or an InterPlanetary File System (IPFS).

When receiving a transaction containing the NFT metadata information, the NFT smart contract may mint an AI pipeline NFT corresponding to the transaction.

Meanwhile, the NFT minted on the NFT smart contract may serve as a persistent identifier to which the blockchain network address is connected when the transaction is finally verified at a blockchain consensus node.

The AI pipeline may include a plurality of modules constituting an AI model.

The plurality of modules may include at least one of a data processing module, a data training framework module, an algorithm implementation module, a model evaluation module, a model selection module, a model inference module, a resource management module, a data management module, and a model management module.

A method of executing an artificial intelligence pipeline NFT based on a blockchain network according to another embodiment of the present disclosure includes: minting a blockchain-based NFT including ownership information of the AI pipeline, which is a target for granting code reflecting the blockchain-based NFT, object information related to characteristics of the AI pipeline, and worker node address information executing the AI pipeline according to a request from a client device; executing, by a blockchain network, program code performing a predetermined function in an event node executing the AI pipeline; executing, by the worker node, a target AI pipeline of the NFT; receiving, by the blockchain network, an execution result value of the worker node to record a proof-of-work in the event node; and collecting, by the blockchain network, the execution result value of the worker node on which the proof-of-work is performed to propagate a value to a distributed blockchain network in order to change a blockchain state.

The present disclosure provides a new concept artificial intelligence non-fungible token (AI-NFT) that represents a connection state of each element constituting an AI pipeline in order to provide a value chain connection between AI service providers, AI developers, and technological elements constituting an AI system, which construct an AI ecosystem.

The present disclosure uses the above-described characteristics of NFT to mint the AI-NFT, which is a persistent identifier representing the management and the connection state of each module constituting the AI pipeline, and builds a hyperscale AI pipeline based on a decentralized autonomous organization community that is present on a blockchain network based on the minted AI-NFT, that is, the Internet for AI.

DETAILED DESCRIPTION

Hereinafter, embodiments of the present disclosure will be described in detail with reference to the accompanying drawings so that those skilled in the art may easily practice the present disclosure. However, the present disclosure may be implemented in various different forms, and is not limited to exemplary embodiments described herein.

Since a pipeline of a huge artificial intelligence (AI) model is long and complex, as modules or the like are organically connected, there is a problem in that it is difficult to specify from which part of the pipeline to which part of the pipeline is a unit that a specific subject needs to manage. Therefore, in the present specification, as one element of a blockchain based artificial intelligence-network (AI-network) managed by a decentralized autonomous organization (DAO) to provide AI services or a value chain connection between researchers, an artificial intelligence-non-fungible token (AI-NFT), which is a persistent identifier that proves a connection state of each component constituting each AI service pipeline, will be disclosed in detail below.

In order for the blockchain based AI-Network to be managed by the DAO community, the following three requirements need to be satisfied.

AI service components need to be (1) accountable, (2) reproducible, and (3) valuable. A non-transitory storage medium for storing program code and a method of executing an AI pipeline NFT according to the present disclosure may satisfy the above-described three requirements by enabling transactions on the blockchain network through the NFT to enable easy transactions of the AI pipeline.

In the present disclosure, the components of the AI pipeline that can be modularized are not limited to specific examples, and the following components may be included.

① Data processing for learning such as data collection, verification, pre-processing, and amplification
② Data training framework (e.g., TensorFlow, etc.)
③ Algorithm implementation code (Parameter)
④ Model evaluation and selection (Hyper-parameter)
⑤ Learned model lifecycle management, distribution, and re-learning management
⑥ Model inference service
⑦ Server resource allocation and management such as a graphics processing unit (GPU) for learning/inference
⑧ Learning and inference data storage management according to pipeline All of the various technical components and interacting components constituting AI can be applied as a pipeline, and an AI pipeline NFT may be defined for each corresponding unit.

In the present specification, the AI pipeline may include a plurality of modules constituting the AI model.

The plurality of modules may include at least one of a data processing module, a data training framework module, an algorithm implementation module, a model evaluation module, a model selection module, a model inference module, a resource management module, a data management module, and a model management module.

As such pipeline may be transacted on a blockchain network with NFT, technical competency possessed by each user and an AI pipeline module to be used may be customized according to the intended function, and as the purchased AI pipeline NFT is recombined or modified to enable a transaction on the blockchain network, ease of use and efficiency may be improved in AI development.

In providing the AI services, users may build the entire AI pipeline on their own (on-premise) or consider the scope of outsourcing. In particular, in the scope of outsourcing, the AI pipeline NFT may be easily purchased and used based on determinations such as whether to use cloud services and which open-source software to use for each technology stack.

The present disclosure will be described in detail below with reference to the accompanying drawings.

Figure 1:
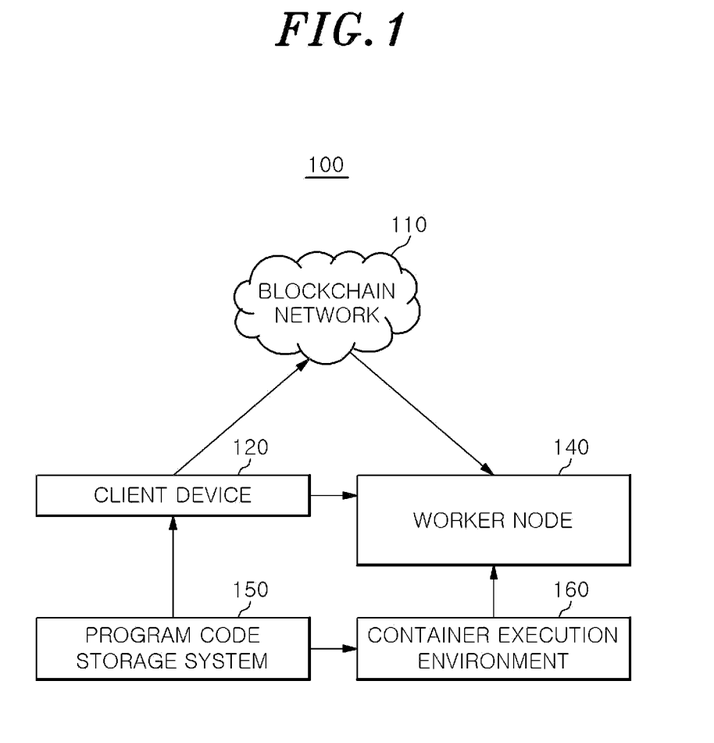
FIG. 1 is a block configuration diagram of a blockchain network in which program code is executed according to an embodiment of the present disclosure.

FIG. 1 is a block diagram of a blockchain network in which program code is executed according to an embodiment of the present disclosure.

Referring to FIG. 1, in order to overcome the problems of the related art described above, a system 100 may provide an environment in which program code and an appropriate software and hardware execution environment necessary for executing the program code are automatically connected. That is, when requirements for hardware in which the program code requested by a user may be executed are set, the system 100 may search for an optimal computer that satisfies the requirements among computers in which a server system and/or a blockchain network system are registered as nodes and connect the retrieved optimal computer to the corresponding program code. In this way, a procedure of connecting the program code to the node on the blockchain network system may be referred to as an "interworking procedure," and the blockchain network system that provides such an environment may be referred to as an "interworking cloud." In addition, the containerized program code can be downloaded to the computer and immediately executed, so a user can easily receive the execution result.

The system 100 in which a search for a node having an execution environment in which the program code is executed on the blockchain network and the program code can be executed in the retrieved node may include a network 110, a client device 120 connected through the network 110, a worker node 140, a program code storage system 150, and a container execution environment 160.

The client device 120 may communicate with the worker node 140 periodically or aperiodically (e.g., in real time) via the network 110. After accessing the interworking cloud through the client device 120, a user may select program code stored in the program code storage system 150. When a user selects program code using the client device 120, a worker node 140 satisfying conditions necessary for the program code to be executed may be searched for. When the worker node 140 capable of executing the program code is retrieved, the execution of the program code progresses through the node, and the user may check the execution result of the program code through the client device 120.

The client device 120, the worker node 140, the program code storage system 150, and the container execution environment 160 illustrated in FIG. 1 may each be any computing device, a storage device, or a combination thereof capable of wired and/or wireless communication. For example, the client device 120 may include a mobile communication terminal, a wireless communication terminal, a smartphone, a tablet personal computer (PC), a desktop PC, a laptop PC, a wearable device, or the like. In addition, FIG. 1 illustrates that one client device 120 communicates with the worker node 140 via the network 110, but is not limited thereto, and a different number of client devices may be configured to communicate with the worker node via the network 110. The network 110 may be configured as wired networks such as Ethernet, a wired home network (power line communication), a telephone line communication device, and RSserial communication, wireless networks such as a mobile communication network, a wireless LAN (WLAN), Wi-Fi, Bluetooth, and ZigBee, or a combination thereof, according to the installation environment.

Figure 2:
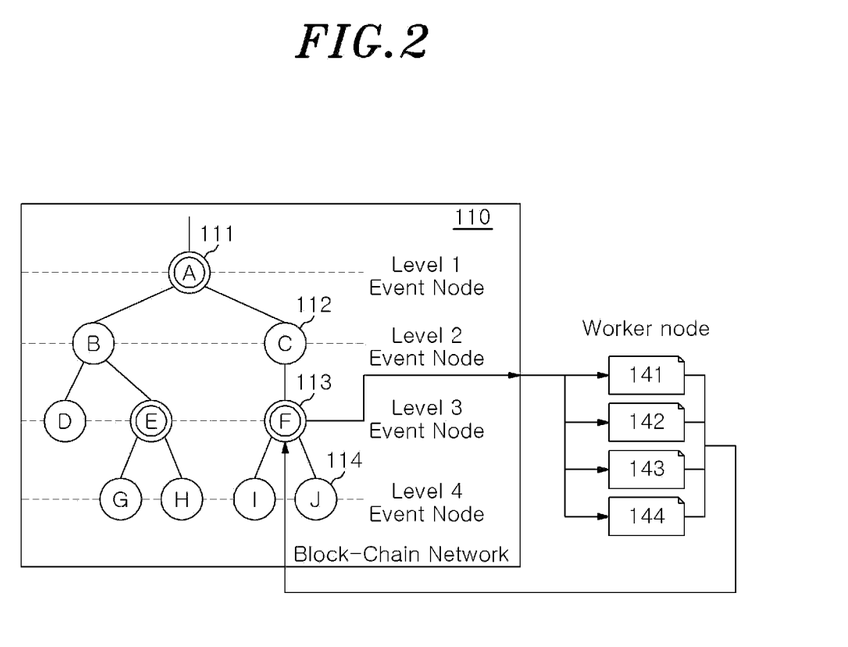
FIG. 2 is a diagram exemplarily illustrating an operation process of an event node and a worker node configured in a tree structure in a blockchain network according to an embodiment of the present disclosure.

FIG. 2 is a diagram exemplarily illustrating an operation process of an event node and a worker node configured in a tree structure in a blockchain network according to an embodiment of the present disclosure.

Referring to FIG. 2, an example in which a plurality of event nodes constituting the blockchain network 110 are connected in the tree structure is illustrated. For example, an aggregate of each node may be defined as an event node. The event node may request the off-chain worker node 140 to use data and execute program code to perform a specific function. The event node may receive a result value performed by the worker node 140 and propagate the received result value to the blockchain network 110 to generate a block.

Referring to FIG. 2, each event node may store program code that is configured in a tree structure including a plurality of sub-trees.

The event node forming the tree structure may be configured like a root node of level 1, a node 112 of level 2, a node 113 of level 3, and a node 114 of level 4. In performing a specific function, functions and data performed by each node may be defined differently by the AI pipeline NFT to be performed.

Referring to FIG. 2, specific program code may be executed based on ownership information of the AI pipeline described in the AI pipeline NFT, object information related to characteristics of the AI pipeline, and worker node address information capable of executing the AI pipeline. Specifically, an AI pipeline NFT owner creates event nodes 111, 112, 113, and 114 based on the information and authority of the NFT. The event nodes 111, 112, 113, and 114 may select the worker node 140 to execute an event. An event (execution of program code) may be performed, and the result value may be transmitted back to the node event nodes 111, 112, 113, and 114.

Referring to FIG. 2, for example, event node F 113 may be a node that manages data usage and execution of a function. Based on the worker node address information recorded in the NFT, the event node F 113 may access at least one worker node 140. For example, a plurality of worker nodes 141, 142, 143, and 144 may execute program code in parallel and derive execution values. The derived execution value may return to the event node F 113. In this case, the event node F 113 may be configured to create a new AI pipeline NFT by selecting excellent tasks among execution values performed in parallel.

In this way, the event nodes 111, 112, 113, and 114 configured in the tree node form may derive the execution value through each worker node 140 and then transmit a proof-of-work of the execution value to an upper-level node, thereby transmitting the proof-of-work to a top node 111. The event node A 111 as the root node may propagate the execution value to the blockchain network 110 to verify a transaction result value and create a new block.

The program code according to the present disclosure may be executed by a non-transitory storage medium. The program code is executed by a hardware processor, and the program code may be executed to trade an AI pipeline in the distributed blockchain network 110 according to the ownership information generated based on the NFT.

The blockchain network 110 may store and manage a database including a plurality of blockchain states that are updated according to one or more transactions related to a function received from the client device 120.

The program code may be executed to mint a blockchain-based NFT that includes the ownership information of the AI pipeline that is a target for granting code reflecting the blockchain-based NFT, the object information related to the characteristics of the AI pipeline, and the worker node address information capable of executing the AI pipeline. Referring to FIG. 2, such object information, ownership information, and node address information may be stored in NFT metadata.

In addition, the program code may be executed to request an execution of the program code performing a predetermined function in an event node executing the AI pipeline according to a request of an NFT owner.

The program code may be executed to access at least one worker node to execute a target AI pipeline of the NFT. The program code may be executed to receive the execution result value of the worker node to record the result value executed at the event node through the proof-of-work.

The program code may be executed to collect the execution result value of the worker node on which the proof-of-work is performed to propagate a value to the distributed blockchain network in order to change a blockchain state.

Figure 3:
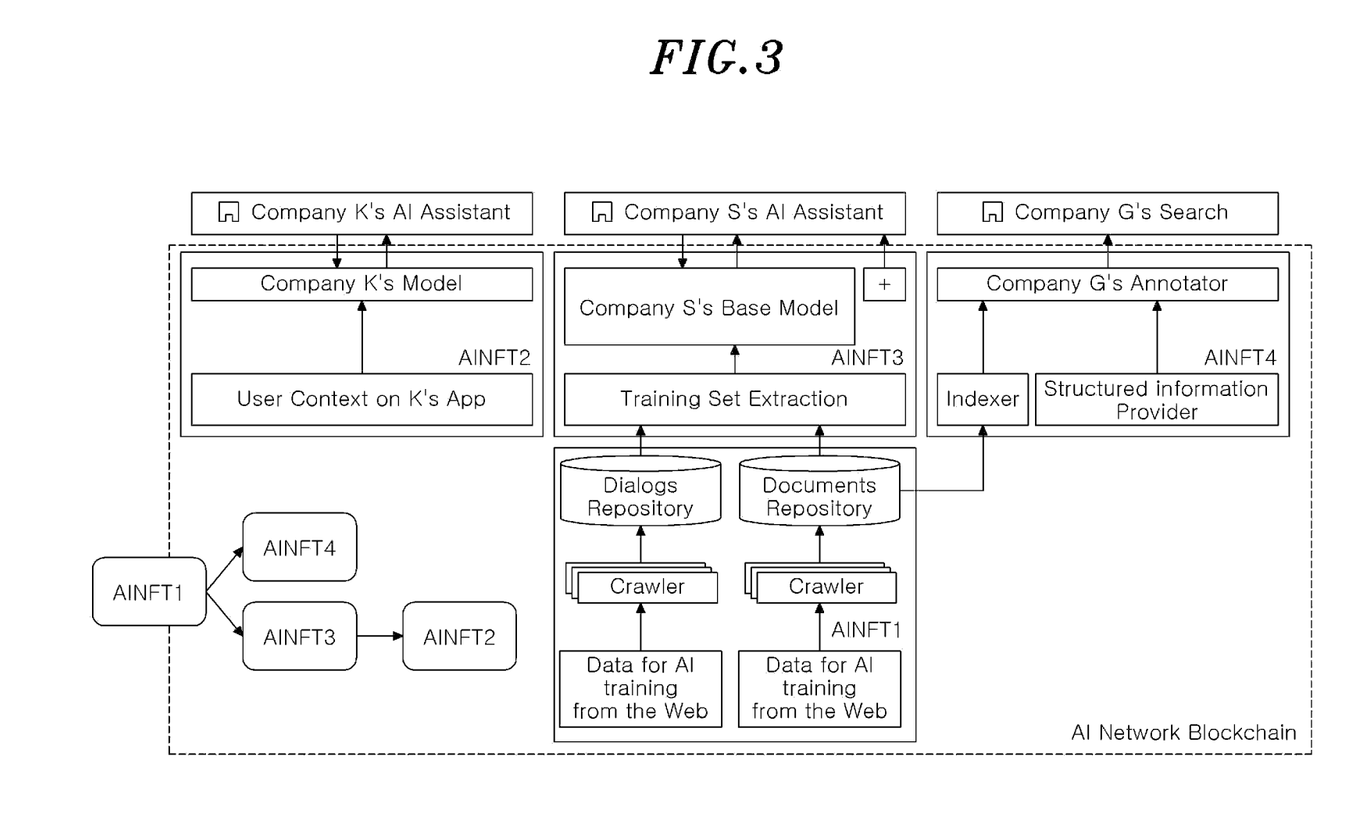
FIG. 3 is a diagram illustrating a configuration example of an artificial intelligence (AI) pipeline non-fungible token (NFT).

FIG. 3 is a diagram illustrating a configuration example of an AI pipeline NFT. Referring to FIG. 3, a diagram illustrating a connection structure of the AI pipeline NFT on the blockchain network is shown. The AI pipeline NFT may function to separate a plurality of containers for creating AI services into units for interconnection.

Containers may be connected based on the container information including a plurality of AI pipeline modules recorded in the NFT, and information on the connection state of each container may be created as a block and provided on the blockchain network.

By providing the AI pipeline NFT, the connection state of the pipeline provided by a resource provider on the blockchain network is managed by the blockchain node and the integrity is guaranteed, so, even if the AI services become huge, the fact that new users or researchers may use the blockchain network in a continuously reproducible state is one of the meanings of the AI pipeline NFT according to the present disclosure.

Referring to FIG. 3, the blockchain network 110 may store program code that configures the state of the blockchain connected by the AI-NFT in the tree structure including the plurality of sub-trees.

Referring to FIG. 3, the program code shows that the pipeline is made with the AI-NFT, and the AI-NFTs are interoperable and participate with each other. Specifically, it indicates that the pipeline may be configured between at least one or more different pipelines AI-NFT 1 to AI-NFT 4, and a connection relationship between AI-NFT 1 and AI-NFT 4 and a connection relationship between AI-NFT 1, AI-NFT 3, and AI-NFT 2 may be confirmed. That is, in this way, the connection relationship for each module constituting the AI pipeline may be indicated as a persistent identifier.

Referring to FIG. 2, when the program code is executed through the hardware processor to execute the target AI pipeline of the NFT based on the connection relationship of FIG. 3, the program code may receive an execution value from a worker node corresponding to each layer of nodes of the sub-tree and create the proof-of-work for the execution value in the node of the upper layer, and the node of the top layer may be executed to propagate the proof-of-work to adjacent event nodes that constitute the blockchain network.

The non-transitory storage medium may store the program code that is executed to access a plurality of worker nodes for an event node having a predetermined function to execute the target AI pipeline of the NFT, and select the results for the plurality of execution results to create a new AI pipeline NFT.

Figure 4:
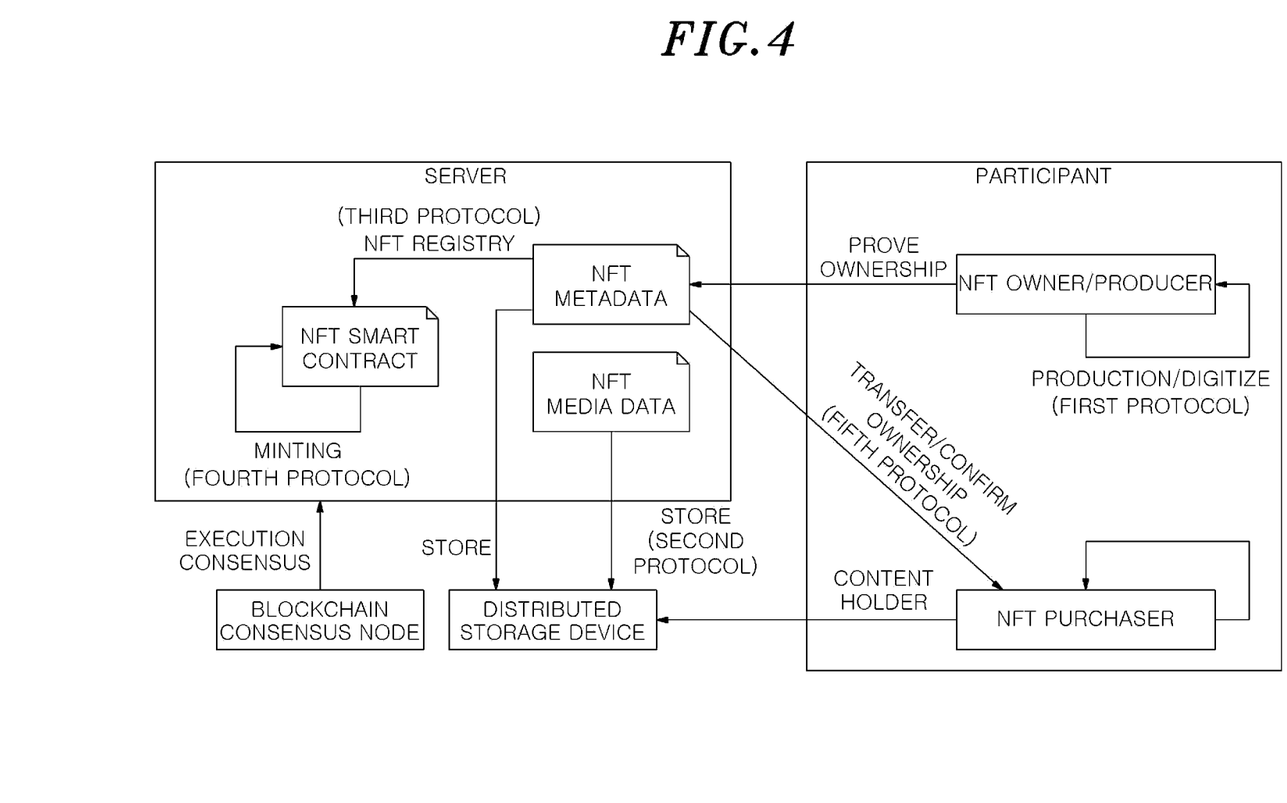
FIG. 4 is a diagram illustrating the roles of components of the AI pipeline NFT according to the embodiment of the present disclosure and each component for creation and ownership change.

FIG. 4 is a diagram illustrating roles of components of the AI pipeline NFT according to the embodiment of the present disclosure and each component for creation and ownership change.

Referring to FIG. 4, the NFT is created in the following manner. A first protocol is NFT digitization, and an NFT owner confirms whether files, titles, and descriptions match, and the owner converts raw data into digital information. A second protocol is NFT storage, and the NFT owner stores raw data in an external distributed storage device of the blockchain. A third protocol is NFT signature, and the NFT owner signs transaction details including NFT data, and transmits the transaction details to an NFT smart contract. In a fourth protocol, the NFT smart contract receives the transaction details containing NFT data to mint the NFT. In a fifth protocol, when the transaction details for the NFT are confirmed on the blockchain network, the NFT may be linked with its own unique blockchain address as persistent proof.

Referring to FIG. 4, the AI pipeline NFT may include the NFT metadata and the NFT smart contract.

The NFT metadata may store the URI information or the like connected to the program code that includes the information on the ownership of the AI pipeline, the object information related to the characteristics of the AI pipeline, and the worker node address information capable of executing the AI pipeline.

Meanwhile, the NFT media data connected to the NFT metadata may be code data of the AI pipeline, preprocessed data for AI learning, or the like, which may be data stored in an external storage or an InterPlanetary File System (IPFS).

The NFT smart contract may receive the transaction containing the NFT metadata information and mint the AI pipeline NFT corresponding to the received transaction.

Meanwhile, when the transaction is finally verified at a blockchain consensus node, the NFT minted on the NFT smart contract may serve as a persistent identifier to which the blockchain network address is connected.

Figure 5:
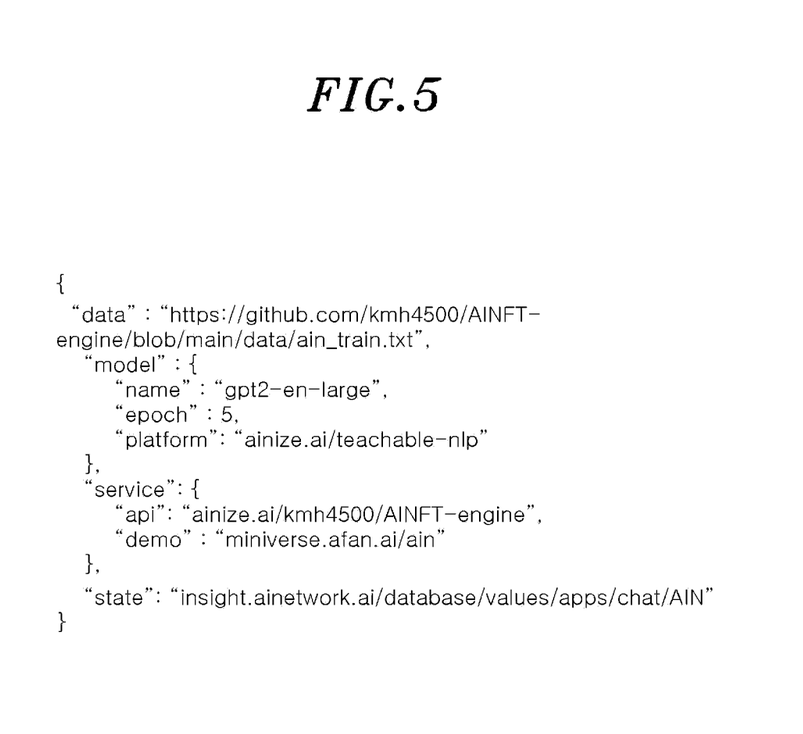
FIG. 5 is a diagram illustrating an exemplary schema of the AI pipeline NFT.

FIG. 5 is a diagram illustrating an exemplary schema of the AI pipeline NFT.

Referring to FIG. 5, the schema represents the entire pipeline configuring one service, and is configured of basic structural units in which data, models, and services configure AI services. Each item may be created with another AI-NFT, and different AI-NFTs may be combined to configure a larger unit of service. The illustrated state is a space where the service specified in the AI pipeline NFT receives data on the Internet and records the results. In the example, the AI network blockchain is managing the state of the service.

Figure 6:
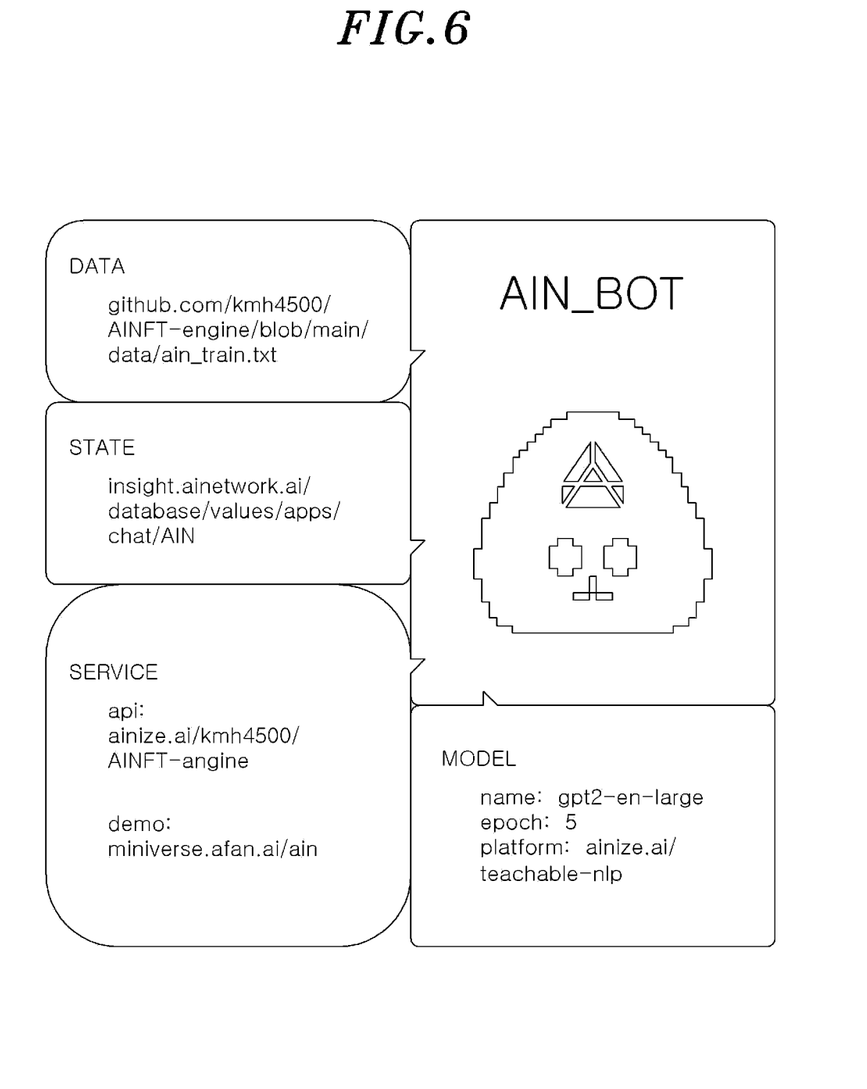
FIG. 6 is a diagram illustrating an embodiment of creating the AI pipeline NFT.

FIG. 6 is a diagram illustrating an embodiment of creating the AI pipeline NFT. Referring to FIG. 6, an example of the AI pipeline NFT actually registered in the NFT market Opensea is illustrated.

The method, operation, or techniques of the present disclosure may be implemented by various means. For example, these techniques may be implemented in hardware, firmware, software, or a combination thereof. Those skilled in the art will appreciate that various illustrative logical blocks, modules, circuits, and algorithm operations described in connection with the disclosure herein may be implemented as electronic hardware, computer software, or combinations of the electronic hardware and the computer software. To clearly illustrate the interchangeability of the hardware and software, various illustrative components, blocks, modules, circuits, and operations have been generally described above in terms of their functions. Whether such functionality is implemented as hardware or software changes according to particular applications and design requirements imposed on the overall system. Those skilled in the art may implement the functions described in varying ways for each particular application, but such implementations should not be interpreted as causing a departure from the scope of the present disclosure.

In the hardware implementation, processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices, and other electronic units designed to perform the functions described in this disclosure, a computer, or a combination thereof.

In firmware and/or software implementation, the techniques may be implemented as instructions stored on computer-readable media such as a random access memory (RAM), a read-only memory (ROM), a non-volatile random access memory (NVRAM), a programmable read-only memory (PROM), an erasable programmable read-only memory (EPROM), an electrically erasable PROM (EEPROM), a flash memory, a compact disc (CD), and a magnetic or optical data storage device. The instructions may be executable by one or more processors, and may allow the processor(s) to perform certain aspects of the functionality described in this disclosure.

When implemented in software, the techniques may be stored on a computer-readable medium as one or more instructions or code, or transmitted over the computer-readable media. The computer-readable media includes both computer storage media and communication media including any medium that facilitates the transmission of a computer program from one location to another. The storage media may be any available media that may be accessed by a computer. As a non-limiting example, such computer-readable media may include a RAM, a ROM, an EEPROM, a CD-ROM or other types of optical disk storage, magnetic disk storage or other magnetic storage devices, or desired program code in the form of instructions or data structures, and any other media that may be used for transporting or storing desired program code in the form of instructions or data structures and may be accessed by a computer. In addition, any access is properly called a computer-readable medium.

A software module may reside in a RAM memory, a flash memory, a ROM memory, an EPROM memory, an EEPROM memory, registers, a hard disk, a removable disk, a CD-ROM, or any other form of storage medium known in the art. An exemplary storage medium may be coupled to a processor such that the processor may read information from, or write information to, the storage medium. Alternatively, the storage medium may be integrated into the processor. The processor and the storage medium may reside within an ASIC. The ASIC may be present in a user terminal. Alternatively, the processor and the storage medium may be present as separate components in the user terminal.

In the embodiments described hereinabove, components and features of the present disclosure were combined with each other in a predetermined form. It is to be considered that the respective components or features are optional unless explicitly stated otherwise. The respective components or features may be implemented in a form in which they are not combined with other components or features. In addition, some components and/or features may be combined with each other to configure the embodiment of the present disclosure. A sequence of operations described in the embodiments of the present disclosure may be changed. Some components or features of any embodiment may be included in another embodiment or replaced by corresponding components or features of another embodiment. It is obvious that claims that do not have an explicitly referred relationship in the claims may be combined with each other to configure an embodiment or included in new claims by amendment after filing.

It will be apparent to those skilled in the art that the present disclosure can be embodied in other forms without departing from the spirit and essential features of the present disclosure. Accordingly, the above embodiments are to be considered in all respects as illustrative and not restrictive. The scope of the present disclosure should be determined by rational interpretation of the appended claims and all possible changes within the equivalent scope of the present disclosure.

The invention claimed is:

1. A non-transitory storage medium for storing program code, wherein the program code is executed by a hardware processor,
   the program code is executed to transact an artificial intelligence (AI) pipeline based on ownership information created based on a non-fungible token (NFT) in a distributed blockchain network,
   the distributed blockchain network stores and manages a database, the database including a plurality of blockchain states that are updated, according to one or more transactions related to a function received from a client, and
   the program code is further executed through the hardware processor to:
   i) mint a blockchain-based NFT including ownership information of the AI pipeline, which is a target for granting code reflecting the blockchain-based NFT, object information related to characteristics of the AI pipeline, and worker node address information executing the AI pipeline,
   ii) request an execution of program code performing a predetermined function in an event node executing the AI pipeline according to a request of an NFT owner,
   iii) access at least one worker node to execute a target AI pipeline of the NFT,
   iv) receive an execution result value of the worker node to record a proof-of-work for the execution result value in the event node, and
   v) collect the execution result value of the worker node on which the proof-of-work is performed to propagate a value to the distributed blockchain network in order to change a blockchain state.

2. The non-transitory storage medium of claim 1, wherein the distributed blockchain network configures a plurality of blockchain states in a tree structure including a plurality of sub-trees.

3. The non-transitory storage medium of claim 2, wherein, when the program code is executed through the hardware processor to execute the target AI pipeline of the NFT,
   the program code receives an execution value from a worker node corresponding to each layer of event nodes of the sub-trees and creates the proof-of-work of the execution value with a node of an upper layer, and
   a node of a top layer is executed to propagate the proof-of-work to the event node.

4. The non-transitory storage medium of claim 1, wherein the program code accesses a plurality of worker nodes for an event node having a predetermined function to execute the target AI pipeline of the NFT, and
   selects results for a plurality of execution results to create an AI pipeline NFT.

5. The non-transitory storage medium of claim 4, wherein the AI pipeline NFT includes NFT metadata and an NFT smart contract.

6. The non-transitory storage medium of claim 5, wherein the NFT metadata includes ownership information of the AI pipeline, object information related to characteristics of the AI pipeline, and worker node address information executing the AI pipeline.

7. The non-transitory storage medium of claim 5, wherein the NFT smart contract mints the AI pipeline NFT including program code in which an address of the NFT metadata is stored.

8. The non-transitory storage medium of claim 1, wherein the AI pipeline includes a plurality of modules constituting an AI model.

9. The non-transitory storage medium of claim 8, wherein the plurality of modules includes at least one of a data processing module, a data training framework module, an algorithm implementation module, a model evaluation module, a model selection module, a model inference module, a resource management module, a data management module, and a model management module.

10. A method of executing an artificial intelligence pipeline Non-Fungible Token (NFT) based on a blockchain network, the method comprising:

minting a blockchain-based NFT including ownership information of an Artificial Intelligence (AI) pipeline, which is a target for granting code reflecting the blockchain-based NFT, object information related to characteristics of the AI pipeline, and worker node address information executing the AI pipeline according to a request from a client device;

executing, by a blockchain network, program code performing a predetermined function in an event node executing the AI pipeline;

executing, by at least one worker node, a target AI pipeline of the blockchain-based NFT;

receiving, by the blockchain network, an execution result value of the worker node to record a proof-of-work in the event node; and     collecting, by the blockchain network, the execution result value of the worker node on which the proof-of-work is performed to propagate a value to a distributed blockchain network in order to change a blockchain state.

\* \* \* \* \*